United States Patent Office 3,133,359
Patented May 19, 1964

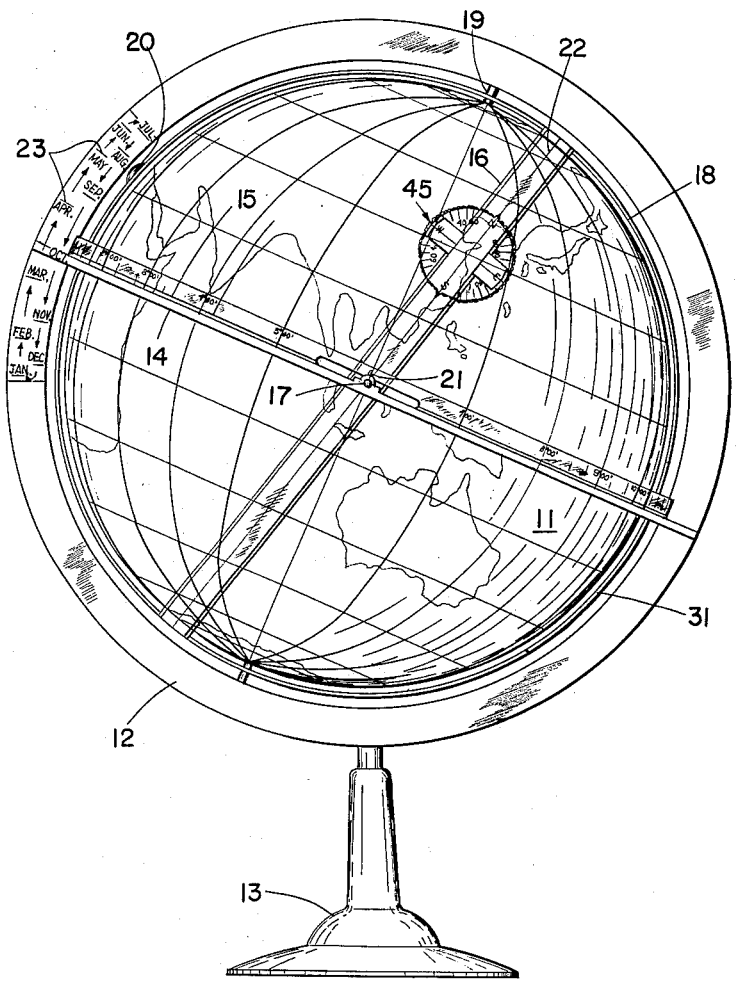

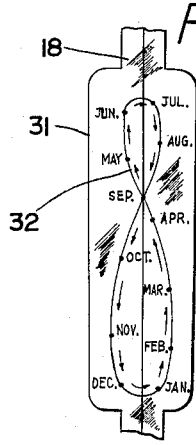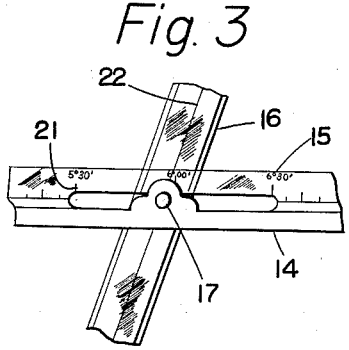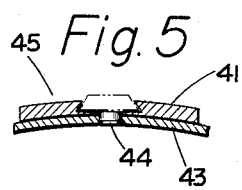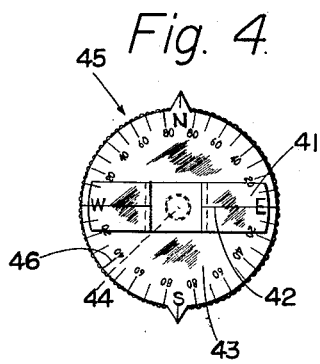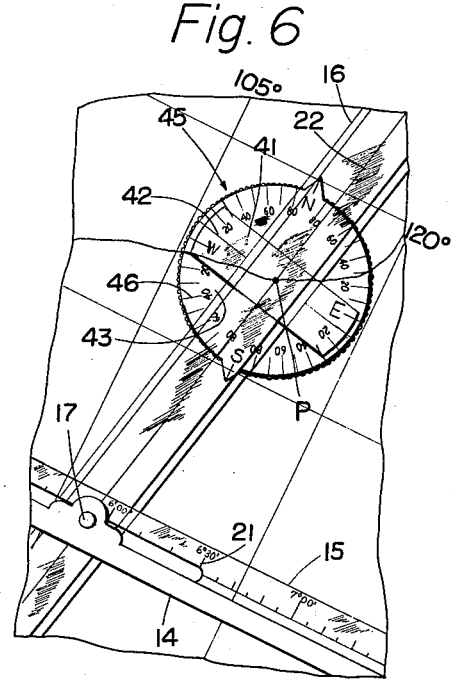

3,133,359
TELLURIAN
Takashi Kuriyama, 770 Kugahara-cho, Ohta-ku,
Tokyo, Japan
Filed June 19, 1961, Ser. No. 118,025
10 Claims. (Cl. 35—46)

The present invention relates to a terrestrial globe including an equatorial ring, a ring for determining the times of sunrise and sunset and a compass dial. More specifically, the present invention comprises a terrestrial globe that enables anyone to determine the time of sunrise, the time of sunset and the compass direction at any location and for any day of the year, to a highly practical and useful degree of accuracy.

Knowledge of the times of sunrise, sunset for any day of the year, and the compass directions, are highly useful and essential in many human activities such as touring or mountaineering, agriculture. Especially in the planting of trees and shrubs it is essential to know the areas of shade afforded in summer and of exposure to sunlight in winter.

Prior to my invention it was necessary, in determining the times of sunrise, sunset and compass directions, at any given point, to employ complicated computations using spherical trigonometry, then, using these computations, to enter the nautical almanac to obtain the desired results. Even so, due to limitations of the almanac, the figures for only a limited number of locations can be computed. With the present invention, no difficult computations or calculations are required: and anyone can easily learn to read off directly the aforesaid values with a practical and useful degree of accuracy.

It is, therefore, the primary object of the invention to provide a terresterial globe with a time ring, a ring graduated in times of sunrise and sunset and a compass direction dial, all correlated to render facile the determination of these values at any selected point upon the earth's surface, and, in the case of times of sunrise and sunset for any given or selected day of the year.

A further object of the invention is to provide a terrestrial globe with a transparent ring graduated in times of sunrise and sunset, the inclination of said ring being adjustable in accordance with the height of the sun's position.

Yet another object of the invention is to provide a terrestrial globe with a ring as in the preceding paragraph, said ring being provided with a transparent compass direction dial mounted for sliding on and along the ring.

Still a further object of the invention is to provide a terresterial globe with a transparent latitude ring provided with a means compensating for the equation of time.

These and other objects and advantages will become apparent to those skilled in the art after a study of the present specification, in connection with the accompanying drawings, in which:

FIG. 1 is an elevation showing the assembled globe, rings, and dial,

FIG. 2 is a detail view showing the compensating means for the equation of time, FIGURE 3 is a detail view showing the pivotal connection between the time ring and the sunrise and sunset ring, FIG. 4 shows the compass direction dial used for obtaining the direction of sunrise and sunset, FIG. 5 is a sectional view of FIGURE 4 and FIG. 6 is a view showing how the invention is used.

Referring particularly to FIGURE 1, 13 is a base or standard supporting a vertical ring 12 for rotation about a normally vertical axis. Globe 11 has latitude and longitude lines scribed or formed thereon in accurate relation with the outlines of the continents, and other geographical features, and is journaled within ring 12, as by aligned trunnions 19, for rotation about its polar axis, in and relatively to the ring. The axis of rotation is inclined to the vertical, in the plane of ring 12, at 23°27′, corresponding to the actual inclination of the earth's polar axis relatively to the plane of the ecliptic. The longitude lines may be spaced at 15° intervals and the parallels of latitude at 10° or 20° intervals. Other longitude lines may be shown or marked upon the globe, corresponding to a particular local time for the point or points through which it passes, such as 82.5° E for the area including India and Ceylon.

An equatorial ring 14 is fixedly connected with ring 12 in a plane normal thereto, and in such a position that its upper planar surface coincides with, that is, is coplanar with, the equatorial line depicted upon globe 11. A time ring 15 is slidably mounted upon equatorial ring 14, coaxially therewith for rotation about their common center which, of course, coincides with the center of globe 11. As indicated at 21, ring 15 bears graduations of time. See FIGURES 1, 3 and 6. At diametrically opposite points, ring 14 is widened to provide supports for diametrically opposite pivot shafts or gimbals 17 only one of which is shown. As will be understood, these shafts are coaxial and coincident with a common diameter of the globe, at all times in the equatorial plane thereof. Reference to FIGURE 3, shows how rings 14 and 15 are cut away over limited portions of their peripheries, to conjointly define a slot through which each respective shaft 17 extends to the inner or concave sides of these rings. From FIGURES 3 and 6 it is noted that the plane defined by the surface or line of contact between rings 14 and 15, at all times passes through the common axis of shafts 17.

A 360° ring 16 is journaled upon the inner ends of aligned shafts 17, for pivoting about the axis thereof which axis, of course, is coincident with a diameter of the ring. As shown upon FIGURE 1, this ring is transparent and has scored or marked thereon, a central circumferential line 22. Ring 16 extends about the globe inside ring 12 and is integrally fixed with, and mounts, an equation of time ring 18. These two rings 16 and 18 move as a unit and lie in mutually normal planes each passing through the center of globe 11. Thus, as ring 16 pivots about the axis of shafts 17, ring 18 simultaneously slides in its own plane along and relatively to, rings 14 and 15. Ring 18 is slotted over a limited arc at each pole of the globe so that it may so slide without interference from the pivotal mounting 19 of globe 11 within ring 12.

A spot or indicium 20, FIGURE 1, is fixed on ring 18 and, since this ring lies in a plane normal to the plane of ring 16, represents the angular position of the sun relatively to the earth. Thus, for the setting of the parts shown upon FIGURE 1, that area of the globe bounded by line 22, to the left thereof, represents day and the area to the right represents night. It is noted from FIGURE 1, that ring 12 is graduated at 23 over the N—S path of adjustment of spot or indicium 20, with indicated months of the year. Thus, when ring 18 is adjusted in its own plane, as aforesaid, to bring indicium 20 beneath the month and approximate day of the year on scale 23, the indicium is adjusted so that the radius therefrom to the center of the globe, makes the same dihedral angle with the plane of the equator thereof, as a line from the actual sun to the center of the earth makes with the plane of the earth's equator.

Furthermore, when the instrument is properly set for any given day of the year as subsequently explained, the point at which line 22 crosses the lower or graduated edge of time ring 15, on the hemispherical portion shown upon FIGURE 1, is indicative of the time of sunset for the location on globe 11 immediately beneath indicium 20. Similarly, the point on line 22 displaced 180° from the aforesaid point, is indicative of the time of sunrise for the location on globe 11 beneath indicium 20. It will be understood also, that, as previously described, ring 14 is fixed with ring 12 in a plane normal thereto, so that the common line of shafts 17 is maintained normal to the plane of ring 12. Also as previously noted, ring 18 is provided with slots at the points where polar pivots 19 pass therethrough, so that ring 18 may be rotated in its own plane to adjust the plane determined by line 22 on ring 16 at any angle from 0° to 23°27' with the plane determined by the intersecting lines of polar axis 19 and the axis of shafts 17, on either side of polar axis 19. In FIGURE 1 the plane of line 22 is shown adjusted clockwise from the plane of axes 19 and 17 but, as just explained, the aforesaid slots also permit a counterclockwise adjustment up to 23°27'.

As is well known, due to the fact that the earth's polar axis is inclined at 23°27' to the plane of the ecliptic, that is, the plane in which the center of the earth moves about the sun, and also to the fact that the path of the earth about the sun is elliptical rather than circular, while its linear velocity is constant, mean time lapses uniformly. At certain times mean time agrees with apparent time, at other times it is behind and in advance of apparent time by as much as 16 minutes. The difference between apparent and mean time is known as the equation of time. Since ordinary clocks and chronometers register mean time, a time correction or compensation is required, which varies throughout the year, to give the time of sunrise and for sunset in terms of mean time rather than apparent time.

FIGURE 2 shows an embodiment of the equation of time compensating means. That portion of ring 18 diametrically opposite indicium or spot 20 is widened as at 31 and is formed with an equation of time line, or analemma 32, with points spaced therealong respectively identifying the first day of each month throughout the year. The arrangement is such that when time ring 15 is shifted in its own plane, relatively to ring 14, to bring its 12 o'clock indicium directly beneath that point on analemma 32 corresponding to the month and approximate day of the year, the respective intersections of line 22 with the time scale on ring 15 give correct mean times rather than apparent times, for sunrise and sunset. Rings 15 and 16 are preferably of transparent plastic material. Ring 18 may also be of like material.

Ring 16 is trapezoidal in transverse cross section as indicated in dotted lines upon FIGURE 5. A bar or slide 41 has a transverse slot formed to receive ring 16 with a smooth accurate fit so that the bar may move in translation only along and relatively to the ring. Bar 41 has a line 42 formed therein with east and west designations as shown. Line 42 lies at all times in a direction normal to line 22 on ring 16. In the model shown, the bar is positioned beneath ring 16, that is, between the ring and globe. A compass or azimuth dial 45, of transparent material, is centrally pivoted at 44 to bar 41, at the radius of globe 11 passing through lines 22 and 42 and is conveniently graduated and marked, as shown, with 90° points at "N" and "S" decreasing in each direction to 0° at "E" and "W." Thus the assembly of bar 41 and dial 45 may be slid to any position on and along ring 16, while the dial may be turned about its pivot 44 relatively to the bar.

As an example of use of the invention, assume that the sunrise time (at the local sandard time) at Hong Kong on August 1 is required. First, shift rings 16 and 18 as a unit, to bring spot 20 indicating the direction of the sun into registration with August 1 of month and day scale 23 on supporting frame 12. Secondly slide time ring 15 so that the 12 oclock line thereof registers with the August 1 indicium of line 32 showing the equation of time. Then all points directly beneath line 22 lie in the sunrise or sunset zone for the selected day. Thirdly, rotate globe 11 and slide bar 41 along ring 16, so that point "P," FIGURE 6, that is, the center of dial 45, lies directly above the position of Hong Kong as depicted upon the globe, as shown in FIG. 6. Then the time reading on ring 15 at its intersection with the standard time longitude (120° E) gives accurately the sunset time of the local standard time at Hong Kong. Further, in order to determine the sunrise and sunset times at various locations in terms of Tokyo time, it is sufficient to read time scale 15 at its intersection with the 135° E meridian.

The azimuth of sunrise and sunset are obtained from compass dial 45. Since, as previously explained, line 22 on ring 16 when properly adjusted and correlated with globe 11, defines a line of demarcation between day and night for the given day of the year, and location over which point P lies, it follows that line 42 on bar 41 coincides with the directions of sunrise and sunset. Consequently, these directions can be determined simply by pivoting dial 43 until its N—S diameter coincides with the meridian through point P and reading the indications on the respective ends of lines 42 on the azimuth scale of dial 43. Thus referring to the parts as shown upon FIGURE 6, the azimuth of sunrise would be E 10° S and that of sunset W 10° N.

From the foregoing description, many other uses for the instrument will be obvious to those skilled in the art, such as the variation of daylight and darkness with the seasons for any given location, differences in time between various locations or cities, and the significance of the equation of time. In fact the educational and utilitarian purposes to which the instrument can be put are numerous. As one example, at the summer solstice in the northern hemisphere, the determined earth's polar axis and the center of the sun, is normal to the ecliptic with the north pole pointing toward the sun. Hence, at this time for all north latitudes up to 23°27', the sun rises and sets in a direction to the north of the true E—W line, while at north latitudes above 23°27' the sun rises and sets in a direction to the south. Such facts are easily demonstrated with my invention, as well as the polar areas under constant darkness or daylight for any day of the year, changes in the angle of incidence of the sun's rays upon any area of the earth with change in the year, reciprocal changes in length of day and night with the seasons, and many others. The invention is, in fact, of great utility in the establishment of an interest in geophysics and the presentation of facts in connection therewith in an instructive and highly educational way.

In the claims, the references to the vertical are for convenience and simplicity in defining the invention as shown upon the drawing, and are not to be interpreted as limiting the invention to any particular position in actual use.

What is claimed is:

1. A tellurian comprising, a base, a vertical first ring fixed with said base, a terrestrial globe having lines of latitude and longitude and a polar axis, means mounting said globe in said first ring for rotation about its polar axis and with said axis in the plane of said first ring, a second ring fixed with said first ring in a plane normal thereto and extending about and contiguous to the equator of said globe, a third ring graduated in time and mounted on said second ring for rotation with respect thereto about said polar axis, and a fourth ring extending about said globe and journaled on and by said second ring for pivoting about said globe on a common diameter of said globe and second ring, normal to the plane of said first ring.

2. A tellurian as in claim 1, a bar mounted on said fourth ring for translation only therealong and having a line thereon tangent to said fourth ring and normal to the plane thereof, and an azimuth dial pivoted to said bar for rotational adjustment about the radius of said globe through the intersection of said line and fourth ring.

3. A tellurian as in claim 2, said fourth ring passing between said second and third rings on the one hand, and said globe, said dial being positioned between said fourth ring and globe.

4. In a tellurian, a base, a vertical first ring fixed with said base, a terrestrial globe having a polar axis, lines of latitude and longitude and outlines of the continents thereon, trunnion means mounting said globe within said first ring for rotation about said polar axis in the plane of said first ring, a second ring fixed with said first ring in a plane normal thereto and extending about the equator of said globe, a third ring having time graduations therealong and mounted for rotation on and relatively to said second ring about said polar axis, a fourth ring extending about said globe and journaled for pivoting on and relatively to said second ring for rotation about a common diameter of said globe and second ring, normal to the plane of said first ring, and a fifth ring fixed with said fourth ring and extending about said globe in a plane normal to said fourth ring, through said polar axis.

5. A tellurian as in claim 4, said fifth ring being coplanar with said first ring and passing adjacent and across said second and third rings at diametrically opposite points thereof, indicator means fixed with said fifth ring simulating the angular position of the sun with respect to said globe and pivotable therewith along said first ring as said fourth ring is pivoted about said common diameter, and scale means fixed with said first ring, said indicator means being movable over and along said scale means to adjust said fourth ring relatively to said globe in accordance with the declination of the real sun, for any day of the year.

6. A tellurian as in claim 5, said indicator means being positioned on said fifth ring on a radius of said globe normal to the plane of said fourth ring.

7. A tellurian comprising a support, a vertical first ring mounted on said support, a terrestrial globe having a polar axis, lines of latitude and longitude, outlines of the continents, and locations of cities thereon, said globe being mounted by and within said first ring for rotation about its polar axis in the plane of said first ring, a second ring fixed with said first ring in a plane normal thereto and extending about said globe contiguous to the equator thereof, a third ring having time graduations and carried by said second ring for coaxial adjustment relatively thereto about said polar axis, the circular line of contact between said second and third rings lying over the equator of said globe, a fourth ring extending about said globe and journaled on said second ring for rotation about the equatorial diameter of said globe normal to the plane of said first ring, said fourth ring having a central circular line extending about said globe as a great circle thereof through said diameter, a fifth ring fixed with said fourth ring and extending about said globe in a common plane with said first ring, an indicium fixed with said fifth ring on a radius of said globe normal to the plane of said central circular line, and a scale carried by said first ring and over and along which said indicium is adjusted in accordance with the sun's declination for any day of the year.

8. In a tellurian, a first ring, a terrestrial globe, journaled in said first ring for rotation on its polar axis in the plane of said first ring, a second ring extending about the equator of said globe and fixed with said first ring in a plane normal thereto, a third ring having time graduations, extending about said globe, and mounted on said second ring for adjustment relatively thereto about said polar axis, a fourth ring extending about said globe and journaled on said second ring for rotation about the common diameter of said globe, second and fourth rings, normal to the plane of said first ring, a fifth ring fixed with said fourth ring and extending about said globe in the plane of said first ring, and an analemma fixed with said fifth ring contiguous its intersection with said third ring and relatively to which said third ring is adjustable along and relatively to said second ring, to correct for the equation of time.

9. A tellurian as in claim 8, said second and third rings being within said first ring, said fourth and fifth rings lying between said second and third rings and said globe, an indicium fixed with said fifth ring and representing the sun, and a scale of months of the year fixed with said first ring contiguous to said indicium and relatively to which said indicium and said fourth and fifth rings are adjustable in accordance with the sun's declination for any day of the year.

10. A tellurian as in claim 9, a bar mounted on said fourth ring for translation only therealong said bar having an indicating line normal to the plane of said fourth ring, and an azimuth dial pivoted to said bar for rotation on and about a radius of said globe through said line, said dial having a scale coaxial of said radius and including N—S and E—W indications, readable against said line.

References Cited in the file of this patent

UNITED STATES PATENTS

| 168,514 | McVicar | Oct. 5, 1875 |
| 2,055,148 | Hagner | Sept. 22, 1936 |
| 2,099,518 | Hazlett | Nov. 16, 1937 |
| 2,102,413 | Hall | Dec. 14, 1937 |

FOREIGN PATENTS

| 592,705 | Germany | Feb. 14, 1934 |